(12) United States Patent
Beadles

(10) Patent No.: US 9,760,575 B2
(45) Date of Patent: *Sep. 12, 2017

(54) SCANNABLE CODE TAGS FOR USE IN SOCIAL NETWORKING AND GROUP INVITATION

(71) Applicant: Robert Dale Beadles, Lodi, CA (US)

(72) Inventor: Robert Dale Beadles, Lodi, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/332,385

(22) Filed: Jul. 16, 2014

(65) Prior Publication Data

US 2014/0330629 A1 Nov. 6, 2014

Related U.S. Application Data

(63) Continuation-in-part of application No. 14/327,502, filed on Jul. 9, 2014, which is a continuation-in-part of application No. 14/269,164, filed on May 4, 2014, which is a continuation-in-part of application No. 14/106,656, filed on Dec. 13, 2013, which is a continuation-in-part of application No. 14/081,766, filed on Nov. 15, 2013, which is a
(Continued)

(51) Int. Cl.
*G06F 17/00* (2006.01)
*G06F 17/30* (2006.01)
*G06Q 30/02* (2012.01)
*G06Q 50/00* (2012.01)

(52) U.S. Cl.
CPC ... *G06F 17/30091* (2013.01); *G06Q 30/0207* (2013.01); *G06Q 30/0225* (2013.01); *G06Q 50/01* (2013.01)

(58) Field of Classification Search
CPC ............ G06Q 10/101; G06Q 30/0223; G06Q 30/0225
USPC ............... 235/375, 382, 385, 462.09, 462.15
See application file for complete search history.

(56) References Cited

U.S. PATENT DOCUMENTS

| 4,070,778 A | 1/1978 | Mahler et al. |
| 4,436,202 A | 3/1984 | Berkley |

(Continued)

FOREIGN PATENT DOCUMENTS

| CA | 2255185 A1 | 6/1999 |
| DE | 3744621 A1 | 4/1988 |

(Continued)

OTHER PUBLICATIONS

Robert Dale Beadles, U.S. Appl. No. 13/759,863, filed Feb. 5, 2013.
(Continued)

*Primary Examiner* — Daniel St Cyr
(74) *Attorney, Agent, or Firm* — Franklin & Associates International Inc; Matthew Lambrinos

(57) ABSTRACT

An apparatus and method for cloud-based storage, retrieval and sharing of files tagged with scannable code tags and group invitation. This application and method includes establishing a user account on a network, the user account being linked to a user space configured to store at least media files for an owner of the user account, generating a scannable code tag, and linking the scannable code tag with the user account and the owner. The method also includes linking a group invitation to one or more media files.

24 Claims, 7 Drawing Sheets

Related U.S. Application Data continuation-in-part of application No. 13/925,724, filed on Jun. 25, 2013, which is a continuation-in-part of application No. 13/759,863, filed on Feb. 5, 2013.

(60) Provisional application No. 61/711,216, filed on Oct. 9, 2012.

(56) References Cited

U.S. PATENT DOCUMENTS

| | | |
|---|---|---|
| 4,439,941 A | 4/1984 | Halperin |
| 4,613,157 A | 9/1986 | Drabish |
| 5,284,365 A | 2/1994 | Stuart |
| 5,513,117 A | 4/1996 | Small |
| 5,626,551 A | 5/1997 | Kearns et al. |
| 5,829,790 A | 11/1998 | Phillips |
| 5,914,158 A | 6/1999 | McGuiness |
| D457,555 S | 5/2002 | Stephens-D'Angelo |
| 6,453,300 B2 | 9/2002 | Simpson |
| 7,490,720 B2 | 2/2009 | Cole et al. |
| 7,734,719 B2 | 6/2010 | Friedman et al. |
| 7,751,069 B2 | 7/2010 | Wen et al. |
| 8,162,229 B1 | 4/2012 | Huse et al. |
| 8,584,931 B2 | 11/2013 | Kim |
| 2001/0018807 A1 | 9/2001 | Proulx |
| 2007/0039215 A1 | 2/2007 | Sheridan |
| 2009/0001150 A1 | 1/2009 | Care |
| 2010/0012714 A1 | 1/2010 | Wessner |
| 2011/0025037 A1 | 2/2011 | Wilen |
| 2011/0209365 A1 | 9/2011 | Marsh et al. |
| 2011/0247247 A1 | 10/2011 | Mayer et al. |
| 2011/0258219 A1 | 10/2011 | Ross et al. |
| 2012/0011751 A1 | 1/2012 | Schimke et al. |
| 2012/0043302 A1* | 2/2012 | Schaltenbrand et al. ..... 218/149 |
| 2012/0180348 A1 | 7/2012 | Keefe |
| 2012/0181330 A1* | 7/2012 | Kim .............................. 235/375 |
| 2012/0284649 A1* | 11/2012 | Levy ............................ 715/753 |
| 2012/0325902 A1* | 12/2012 | Goyal et al. ................. 235/375 |
| 2012/0330707 A1 | 12/2012 | Loucks |
| 2013/0008939 A1 | 1/2013 | Griffin |
| 2013/0043302 A1 | 2/2013 | Powlen et al. |
| 2013/0126598 A1 | 5/2013 | Beadles |
| 2013/0226995 A1 | 8/2013 | Etheredge et al. |
| 2013/0248606 A1 | 9/2013 | Beadles |
| 2014/0108606 A1 | 4/2014 | Beadles |
| 2014/0117076 A1 | 5/2014 | Eberlein |

FOREIGN PATENT DOCUMENTS

| | | |
|---|---|---|
| GB | 2471661 A | 1/2011 |
| RU | 83027 U1 | 5/2009 |
| WO | WO 99/24250 A1 | 5/1999 |
| WO | WO 2013/078255 A1 | 5/2013 |

OTHER PUBLICATIONS

Robert Dale Beadles, U.S. Appl. No. 13/925,724, filed Jun. 25, 2013.
Robert Dale Beadles, U.S. Appl. No. 14/081,766, filed Nov. 15, 2013.
Robert Dale Beadles, U.S. Appl. No. 14/216,878, filed Mar. 17, 2014.
Robert Dale Beadles, U.S. Appl. No. 14/226,829, filed Mar. 27, 2014.
Robert Dale Beadles, U.S. Appl. No. 14/269,164, filed May 4, 2014.
Robert Dale Beadles, U.S. Appl. No. 14/327,502, filed Jul. 9, 2014.
Robert Dale Beadles, U.S. Appl. No. 29/467,339, filed Sep. 18, 2013.
Robert Dale Beadles, U.S. Appl. No. 29/467,343, filed Sep. 18, 2013.
Robert Dale Beadles, U.S. Appl. No. 61/632,100, filed Jan. 17, 2012.
Robert Dale Beadles, U.S. Appl. No. 61/711,216, filed Oct. 9, 2012.
Robert Dale Beadles, U.S. Appl. No. 61/801,098, filed Mar. 15, 2013.
Robert Dale Beadles, U.S. Appl. No. 62/002,849, filed May 24, 2014.
Robert Dale Beadles, U.S. Appl. No. 61/629,741, filed Nov. 22, 2011.
International Search Report, dated Mar. 6, 2013, in International Patent Application No. PCT/US2012/066155, 4 pages.
Written Opinion of the International Search Authority, dated May 22, 2014, in International Patent Application No. PCT/US2012/066155, 5 pages.
International Preliminary Report on Patentability, dated May 27, 2014, in International Patent Application No. PCT/US2012/066155, 1 page.
Office Action, dated Aug. 1, 2013, in U.S. Appl. No. 13/894,896, 25 pages.
Amendment, dated Sep. 17, 2013, in U.S. Appl. No. 13/894,896, 11 pages.
Applicant-Initiated Interview Summary, dated Sep. 18, 2013, in U.S. Appl. No. 13/894,896, 3 pages.
Office Action, dated Dec. 17, 2013, in U.S. Appl. No. 13/894,896, 35 pages.
Amendment, dated Jan. 30, 2014, in U.S. Appl. No. 13/894,896, 25 pages.
Final Office Action, dated Jun. 13, 2014, in U.S. Appl. No. 13/894,896, 13 pages.
Office Action, dated Jul. 2, 2014, in U.S. Appl. No. 14/106,656, 27 pages.
Office Action, dated Sep. 26, 2013, in U.S. Appl. No. 13/601,922, 24 pages.

* cited by examiner

SCANNABLE CODE TAGS FOR USE IN SOCIAL NETWORKING AND GROUP INVITATION

CROSS REFERENCE TO RELATED APPLICATIONS

This application is a continuation-in-part of U.S. Non-Provisional application Ser. No. 14/327,502, filed Jul. 9, 2014, which is a continuation-in-part of U.S. Non-Provisional application Ser. No. 14/269,164, filed May 4, 2014, which is a continuation-in-part of U.S. Non-Provisional application Ser. No. 14/106,656, filed Dec. 13, 2013, which is a continuation-in-part application of U.S. Non-Provisional application Ser. No. 14/081,766, filed Nov. 15, 2013, which is a continuation-in-part of U.S. Non-Provisional application Ser. No. 13/925,724, filed Jun. 25, 2013, which is a continuation-in-part of U.S. Non-Provisional application Ser. No. 13/759,863 filed Feb. 5, 2013, which claims the benefit of U.S. Provisional Application No. 61/711,216 filed Oct. 9, 2012. The entire contents of each patent application identified above is incorporated by reference herein as if fully set forth to provide continuity of disclosure.

STATEMENT REGARDING FEDERAL SPONSORED RESEARCH OR DEVELOPMENT

Not Applicable

REFERENCE TO SEQUENCE LISTING, A TABLE, OR A COMPUTER PROGRAM

Not Applicable

BACKGROUND

Technical Field

Embodiments relate to mobile tagging, and more particularly but not exclusively, to mobile tagging using scannable code tags that facilitate media and delivery, as well as group invitations and information tracking.

Current U.S. Classification: 283/75, 283/77, 235/494, 235/462.1, 235/462.9

BRIEF SUMMARY

According to some embodiments, the present technology is directed to a method for providing a scannable code tag. The method comprises: (a) establishing a user account on a network, the user account being linked to a user space configured to store at least media files for an owner of the user account; (b) generating a scannable code tag; (c) linking the scannable code tag with the user account and the owner; (d) receiving a request to activate the scannable code tag, the request being generated by a scan of the scannable code tag by a user device associated with the owner of the user account; (e) receiving a media file from the user device; (f) storing the media file in the user space associated with the user account; and (g) selecting a group invitation that is associated with the scannable code tag.

In one embodiment the method includes receiving a request for the media file when a recipient scans the scannable code tag with a user device associated with the recipient. Also, the method includes delivering the media file to the user device associated with the recipient and delivering the group invitation to the user device associated with the recipient.

In another embodiment the method includes tracking metrics regarding any of scanning of the scannable code tag by the recipient, viewing of the media file by the recipient, response to the group invitation, and sharing of the group invitation by the recipient on one or more social networks.

In some embodiments, the method includes applying the scannable code tag to an object.

In one embodiment, the method includes receiving a message indicating that a recipient has scanned the scannable code tag and automatically adding the recipient to a group upon the scanning of the scannable code tag.

In some embodiments, the method comprises receiving a message indicating that a recipient has scanned the scannable code tag and accessing user information included on a user device associated with the recipient that was used to scan the scannable code tag. The method also includes pushing the group invitation to the user device associated with the recipient based upon the user information accessed from the user device.

In another embodiment the method further includes providing to the recipient any of a reward, a coupon, an announcement, or combinations thereof.

In other embodiments the method includes linking a gift, reward, offer and/or coupon to the scannable code tag. The group invitation is defined by a merchant or vendor that provides the gift, reward, offer and/or coupon for the scannable code tag. Also, the method includes delivering the gift, reward, offer and/or coupon to a recipient who scans the scannable code tag and automatically adding the recipient to a group.

In one embodiment the method includes receiving a response to the group invitation in the form of a media file generate by the recipient and storing the response in the user space associated with the user account.

In another embodiment the method includes updating the media file with a second media file as well as receiving a scan of the scannable code tag after updating the media file. Further, the method includes delivering the second media file in response to the scan of the scannable code tag.

In one embodiment, the method includes delivering the group invitation to a plurality of recipients that are included in a list associated with the user account.

In some embodiments the list is derived from an electronic address book, a database, a customer relations management system, or combinations thereof.

According to some embodiments, the present technology is directed to a non-transitory computer readable medium having recorded thereon a program.

The program when executed causing a computer to perform a method. In some instances, the method includes: (a) requesting establishment of a user account on a network, the user account being linked to a user space configured to store at least media files for an owner of the user account; and (b) requesting activation of a scannable code tag by scanning the scannable code tag, the request being generated by a scan of the scannable code tag by a user device associated with the owner of the user account.

In some embodiments, the method includes uploading a media file for storage in a user space associated with the user account and selecting a group invitation that is associated with the scannable code tag.

In yet other embodiments, the method includes scanning the scannable code tag after activation of the scannable code tag and receiving the media file; and receiving a group invitation.

In one embodiment the method includes tracking metrics regarding any of scanning of the scannable code tag, viewing of the media file, response to a group invitation, and sharing of the group invitation on one or more social networks.

In some embodiments, the method includes receiving any of a reward, a coupon, an announcement, or combinations thereof in response to scanning the scannable code tag after activation of the scannable code tag.

According to some embodiments, the present technology is directed to a computing device. The computing device comprises: (a) a memory for storing executable instructions, the executable instructions for creating a scannable code tag; and (b) a processor for executing the instructions to: (i) establish a user account on a network, the user account being linked to a user space configured to store at least media files for an owner of the user account; (ii) generate a scannable code tag; (iii) link the scannable code tag with the user account; (iv) receive a request to activate the scannable code tag, the request being generated by a scan of the scannable code tag by a user device associated with the owner of the user account; (v) receive a media file from the user device; (vi) store the media file in the user space associated with the user account; and (vii) automatically add a recipient to a group when the scannable code tag is scanned.

In one embodiment, the processor further executes the instructions stored in memory to receive a request for the media file when the recipient scans the scannable code tag with a user device associated with the recipient. In response the computing device delivers the media file to the user device associated with the recipient and delivers a group invitation to the user device associated with the recipient rather than automatically add a recipient to a group when the scannable code tag is scanned.

In yet other embodiments, the processor further executes the instructions stored in memory to track metrics regarding any of scanning of the scannable code tag by the recipient, viewing of the media file by the recipient, response to the group invitation, and sharing of the group invitation by the recipient on one or more social networks.

In another embodiment, the processor further executes the instructions stored in memory to receive a message indicating that a recipient has scanned the scannable code tag. The computing device also delivers the media file to the user device associated with the recipient and delivers a media file to the user device associated with the recipient after the media file has been delivered.

In one embodiment, the processor further executes the instructions stored in memory to receive a message indicating that a recipient has scanned the scannable code tag. Also, the computing device can access user information included on a user device associated with the recipient that was used to scan the scannable code tag and select the group based upon the user information accessed from the user device.

In yet other embodiments, the processor further executes the instructions stored in memory to provide to the recipient any of a reward, a coupon, an announcement, or combinations thereof after the recipient scans the scannable code tag, wherein the reward, the coupon, and the announcement are provided by a merchant or vendor that also defines the group.

DETAILED DESCRIPTION OF PREFERRED EMBODIMENTS

Figure 1:
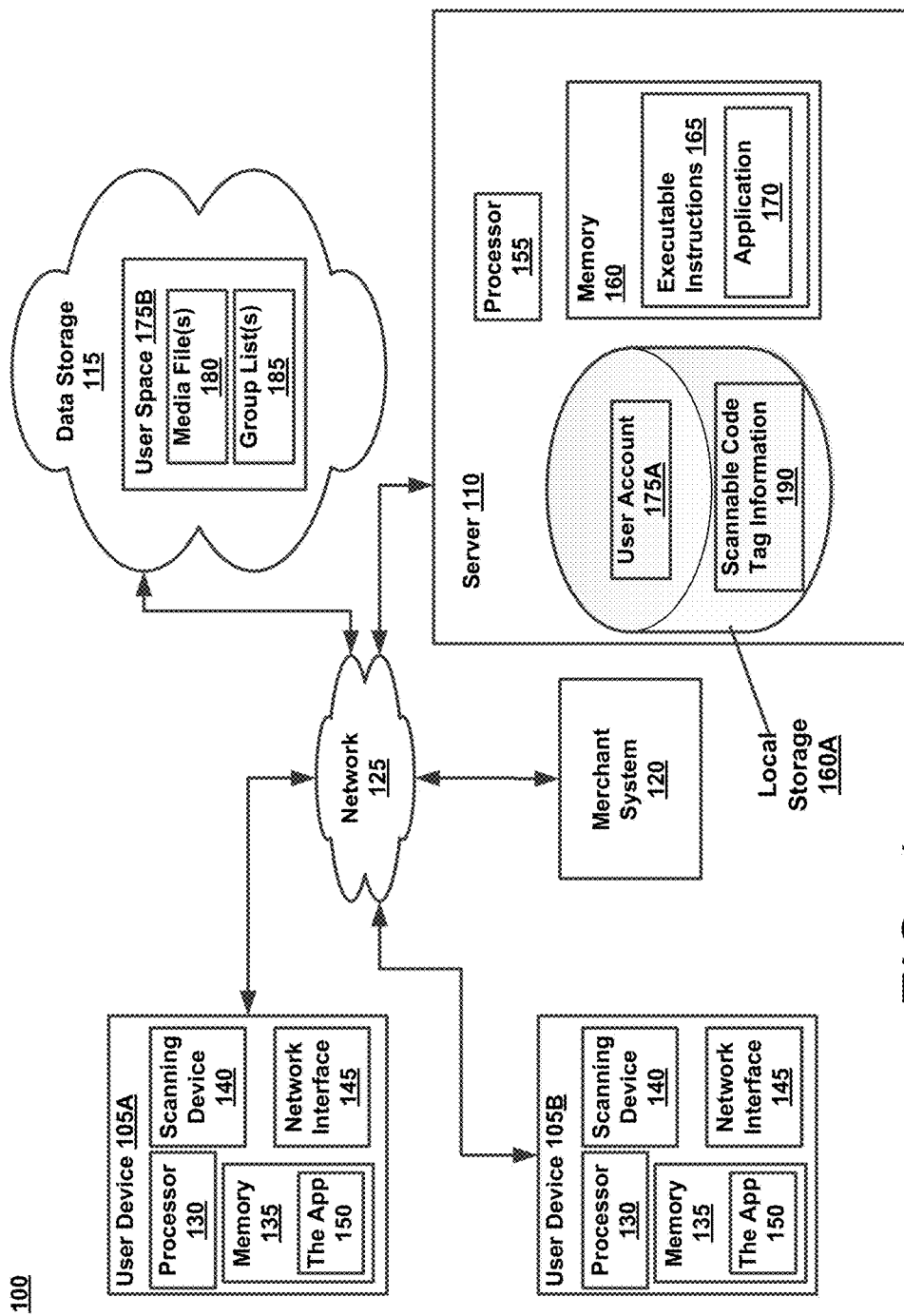
FIG. 1 is a schematic diagram of a computing environment for practicing aspects of the present technology.

In the following description of the best mode of implementation, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N−1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

Multidimensional bar codes, such as the two dimensional (2D) Quick Response (QR) (trademarked) barcode as described in Masahiro, U.S. Pat. No. 5,726,435 and Masahiro, Jap. Pat. No. 2938338, allow users to enjoy both the convenience of traditional print media and the completeness of online media. Multidimensional bar codes with embedded URL codes often appear in magazine articles, business cards, item tags, and advertisements. Individuals, who wish to supplement this published media, may do so by taking a picture of a 2D bar code with a camera enabled cell phone that will redirect them to the programmed URL. The programmed URL can contain unlimited information to supplement the published media, including a products details, videos or contact information. Publishers and users can also print their own 2D barcodes for others.

For the most part, 2D bar codes have been commercially unavailable to individuals who merely want to generate a bar code and associate it with a video, photograph or document. Ordinary consumers and small businesses, find that the expense of investing into this technology exceeds the benefit provided. Further, another difficulty in using this technology is that the URL or video link usually requires a published website or hosting server. Moreover, current 2D bar codes cannot be processed visually and typically require a scanning mechanism.

Cloud storage providers, examples of whom include: Google Drive (trademarked), Rapidshare (trademarked) or Mega, are based on a model of storage where users upload data onto third party hosted servers. Cloud storage providers own large data centers and allow their customers to pay to buy or lease storage capacity on these websites. Some providers, like Rapidshare (trademarked), encourage sharing of user-submitted data by generating unique URL links to user-submitted content. In turn, users share their content with other by providing a URL link to this content. Typically, those who wish to enjoy user-submitted content must download this content through the unique link. For these reasons, clouds storage has become an incredibly popular service for users to upload and share photographs, videos, documents and other information.

Cloud storage models contain numerous disadvantages. URL links are often difficult to input by a user, unattractive on the text, and out of place when inserted into printed media. Further, users are often forced to download content before they may access it. Moreover, the interface of a cloud storage system is not friendly for a novel user and the files are not easily retrievable and shareable.

Embodiments of the present technology involve the use of scannable code tags. A scannable code tag can include any number of visual objects that are capable of being scanned or read by a reader/scanning device. Suitable, non-limiting examples of a scannable code tag include a set or string of alphanumeric characters such as "ABC1235-%$3". Another example is a barcode. The barcode can be coupled with a set or string of alphanumeric characters that can be used as a backup when the barcode is damaged or cannot be scanned properly. In another embodiment, a scannable code tag includes a quick response (QR) code.

The scannable code tag can be one dimensional, two dimensional, three dimensional, or n-dimensional. Dimensionality of the scannable code tag allows for multiple types of information to be encoded into the scannable code tag and retrieved independently from one another. For example, a scannable code tag may be associable with two different user accounts for the same (or different) users. The scannable code tag can embed or represent different handles or logical links that point to these user accounts. In one example, a scannable code comprises a username or an email address associated with a user account. Each of these two types of embedded information can be retrieved independently from one another. In one embodiment, all embedded information is retrieved when the scannable code tag is scanned.

Figure 2:
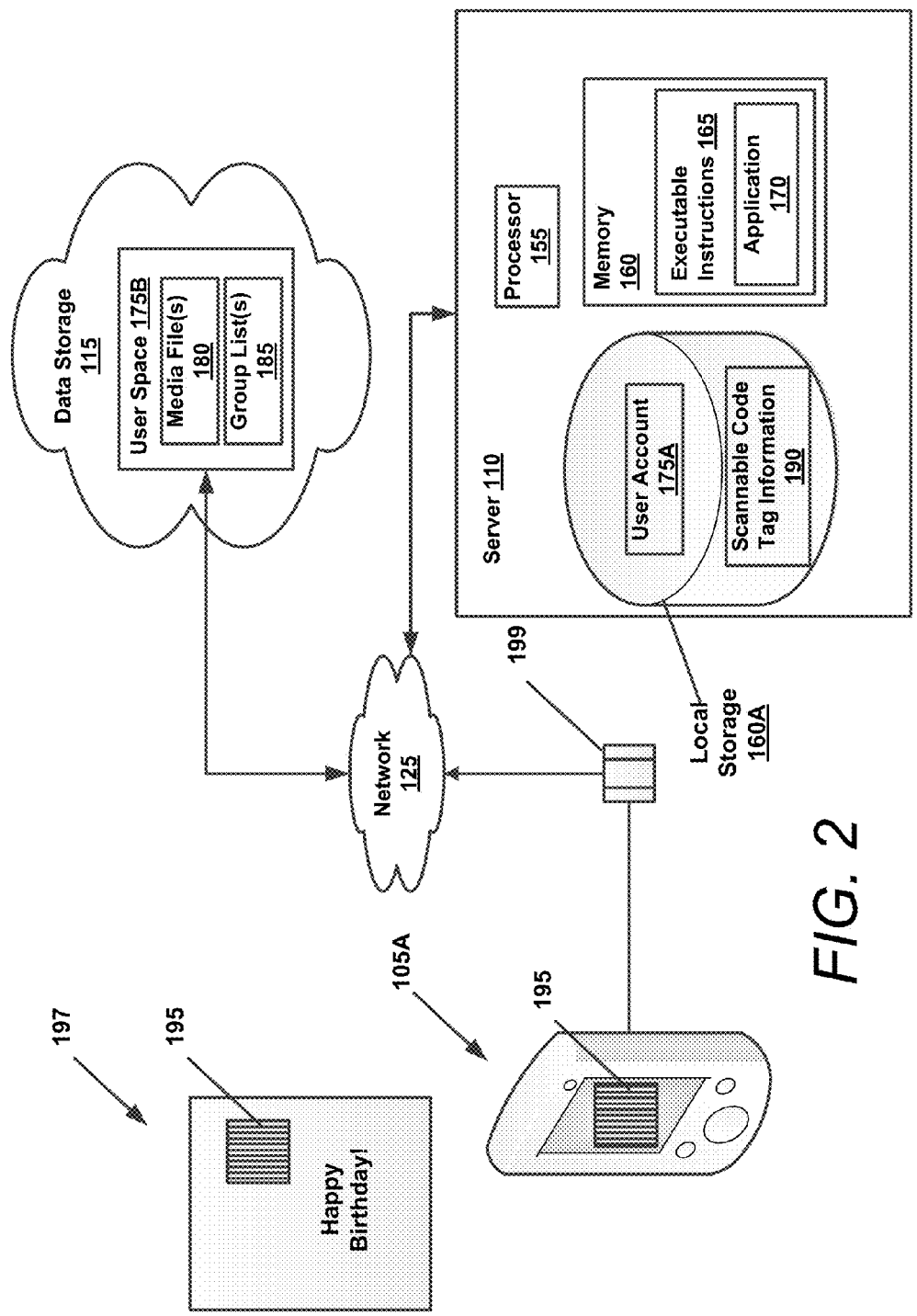
FIG. 2 is a diagrammatic representation of a user account and code activation method of the present technology.

The scannable code tag can be applied to any physical object such as a package, a box, a sign, a letter, a greeting card, a business card, a vehicle, or any other physical article. Any suitable method for applying the scannable code tag to any object is also contemplated such as printing, laser printing, embossing, etching, a decal, a sticker, a tag, or other similar methods or products that would be known to one of ordinary skill in the art with the present disclosure before them. An example scannable code tag is illustrated in FIG. 2, which describes a greeting card with a QR code printed onto the greeting card.

In other embodiments, other types of code tags are utilized. The code tag can be a text code, such as an alphanumeric code or other symbol code, which can be read and entered manually into a computer via user interface, such as a keyboard. In some embodiments, the code tag can be a combination of both an aforesaid scannable code and text code.

In some embodiments, an identifier tag can be used as the code tag or in combination with the code tags described herein. Non-limiting examples of identifiers include any kind of arrangement or pattern of markings, objects, lines, shapes, colors or combination thereof in an image that is recognizable by any type of image recognition technology. For example, in one embodiment, the code tag is represented by one or more 3 dimensional object in a photograph or range scan and readable by a pattern recognition or other image data processing technology. In another embodiment, the code tag is represented by a fingerprint, palm veins, face recognition, DNA, palm print, hand geometry, iris recognition, retina and/or odor/scent or other biometric that is readable by a suitable biometric data processing technology.

Turning to FIG. 1 which is a schematic diagram of a computing environment for practicing aspects of the present technology. The environment 100 generally comprises user devices, such as user device 105A and user device 105B, server 110, data storage 115, merchant system 120, and network 125. In addition to the specific purpose computing elements and algorithms described below, each of the computing devices of the environment 100 may utilize features of a computing system or machine illustrated in FIG. 6 and described in greater detail below. It will be understood that some of the computing elements of the environment 100 can be combined together, such as the server 110 and the data storage 115.

Components of the environment 100 such as the server 110 and data storage 115 may be implemented in a web server or cloud-based computing environment. A cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In other embodiments, the server 110 and data storage 115 may each include a distributed group of computing devices such as web servers that do not share computing resources or workload.

End users may access and interact with the environment via an end user computing device such as user device 105A and user device 105B. For purposes of clarity, user device 105A and user device 105B are each similar end user computing devices such as a mobile communications device, a laptop, a computer, or any other computing device that would be known to one of ordinary skill in the art. Only the components of user device 105A will be described in greater detail. These same components will be included in user device 105B.

For context, user device 105A is associated with a first user or sender that owns a scannable code tag of the present technology. User device 105B is associated with a second user or recipient that scans the scannable code tag after the scannable code tag has been activated.

The user device 105A comprises a processor 130, memory 135, scanning device 140, and network interface 145. The processor 130 is configured to execute instructions that are stored in the memory 135. In one embodiment, the memory 135 is a non-transitory computer readable medium that stores a scanning application, hereinafter referred to as "the app 150". Generally, the App 150, when executed by the processor 130 will allow the user device 105A to perform methods in accordance with the present technology. For example, the methods include activating a scannable code tag, establishing a user account, storing and/or requesting a scannable code tags, as well as other related methodologies which will be described in greater detail infra.

The scanning device 140 of the user device 105A may include one or more different types of scanning devices that are configured to read or capture a scannable code tag of the present technology. The exact configuration and operation of the scanning device 140 will depend upon design requirements such as the type of scannable code tag that needs to be scanned. For example, if a scannable code tag includes a set or string of alphanumeric characters The server 110 may communicatively couple with the user devices 105A and 105B via a network 125. The network 125 may include any one of a number of private and public communications mediums such as the Internet. Other suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 125 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. Each of the user devices 105A and 105B can utilize the network using their respective network interfaces, such as the network interface 145 of the user device 105A.

The server 110 may generally include a processor 155 and memory 160. The processor 155 may execute various instructions stored in memory 160 in order to perform methods described herein. For example, the processor 155 may execute instructions 165 stored in memory 160 to activate and manage a scannable code tag, as well as provide features such as media file delivery, gift or reward provision, group invitation, and other features described herein. The executable instructions may include an application (hereinafter "application 170") that provides the aforementioned activation and management processes.

The server 110 also includes local storage 160A that stores user accounts. For example, user accounts created when the user desires to obtain and use a scannable code tag are stored in the local storage 160A. The user account 175A is linked to a user space 175B in the data store 115 where media files can be stored for the owner of the user account 175A.

Methods executed by the server 110 may alternatively be executed solely by the user devices 105A and 105B. Alternatively, the server 110 and user devices 105A and 105B may cooperatively execute various portions of the methods described herein. For example, computing intensive functions such as extracting of data embedded into a scannable code tag and automatic group creation may be executed by the server 110, while information display, user input, and tag scanning may occur at the user devices 105A and 105B.

The data storage 115 may include a distributed or cloud storage system that is capable of or configured to maintain the user space 175B for each of a plurality of end users, referred to individually as an owner. The account owner can use the user account to store media files 180 and maintain group lists 185.

The end user is prompted to create a user account 175A when the end user downloads the app 150 to their user device 105A. The end user can establish a user profile that includes demographic information about the user, as well as authentication credentials (username and password) for the user. The end user can request, or is automatically provided with, a scannable code tag that is linked to the user account 175A.

The server 110 can generate a unique scannable code tag for the end user. In one example, the scannable code tag is linked to the user account 175A using scannable code tag information 190 such as an identifier. The scannable code tag information 190 allows the user account 175A to be located by the server 110 when the scannable code tag is scanned by a recipient and a request for a media file is received by the server 110 from the recipient. The recipient is associated with the user device 105B, which also includes the app 150.

It will be understood that the app 150 is configured to both create and maintain user accounts, as well as scan scannable code tags to retrieve information associated with the scannable code tag. Stated otherwise, the app 150 can be downloaded by and executed by user devices associated with both the user account owner and the party that ultimately scans the scannable code tag. Examples of these processes are described in greater detail in FIG. 3.

In some embodiments, when the user account is created, the end user is required to grant access for information stored on their user device 105A to the server 110 or a merchant system 120. The merchant system 120 is operated by a merchant or vendor who desires to push communications, messages, deals, gifts, rewards, coupons, membership awards, offers or other content to the user device 105A. In some embodiments, the merchant system 120 may directly push these messages to the user device 105A. In other embodiments, the merchant system 120 can leverage the server 110 to push messages to the user device 105A. In some embodiments, sending or pushing communications, messages, deals, gifts, rewards, coupons, incentives or other content to the user device or recipient device is performed in response to operation by a purchaser, original creator and/or the end user.

After the user account 175A is established by the server 110, the end user can upload one or more media files 180 to a user space 175B created on the data store 115. The end user can also specify group lists 185 that include contact information for potential recipients such as friends, co-workers, social media contacts, students, patients, and the like. The contact information can include email addresses, telephone numbers, social media handles, websites, and so forth.

In some embodiments, the group lists 185 can be determined from examining contact lists for the end user that reside on the user device 105A such as an email address book, a contact list, a customer relations management (CRM) list, or other similar list.

Merchants can access user device information and user account information using their merchant system 120. As mentioned above, the end user may be required to grant access to information to third parties, allowing these third parties access to their user information and/or device information.

Figure 3:
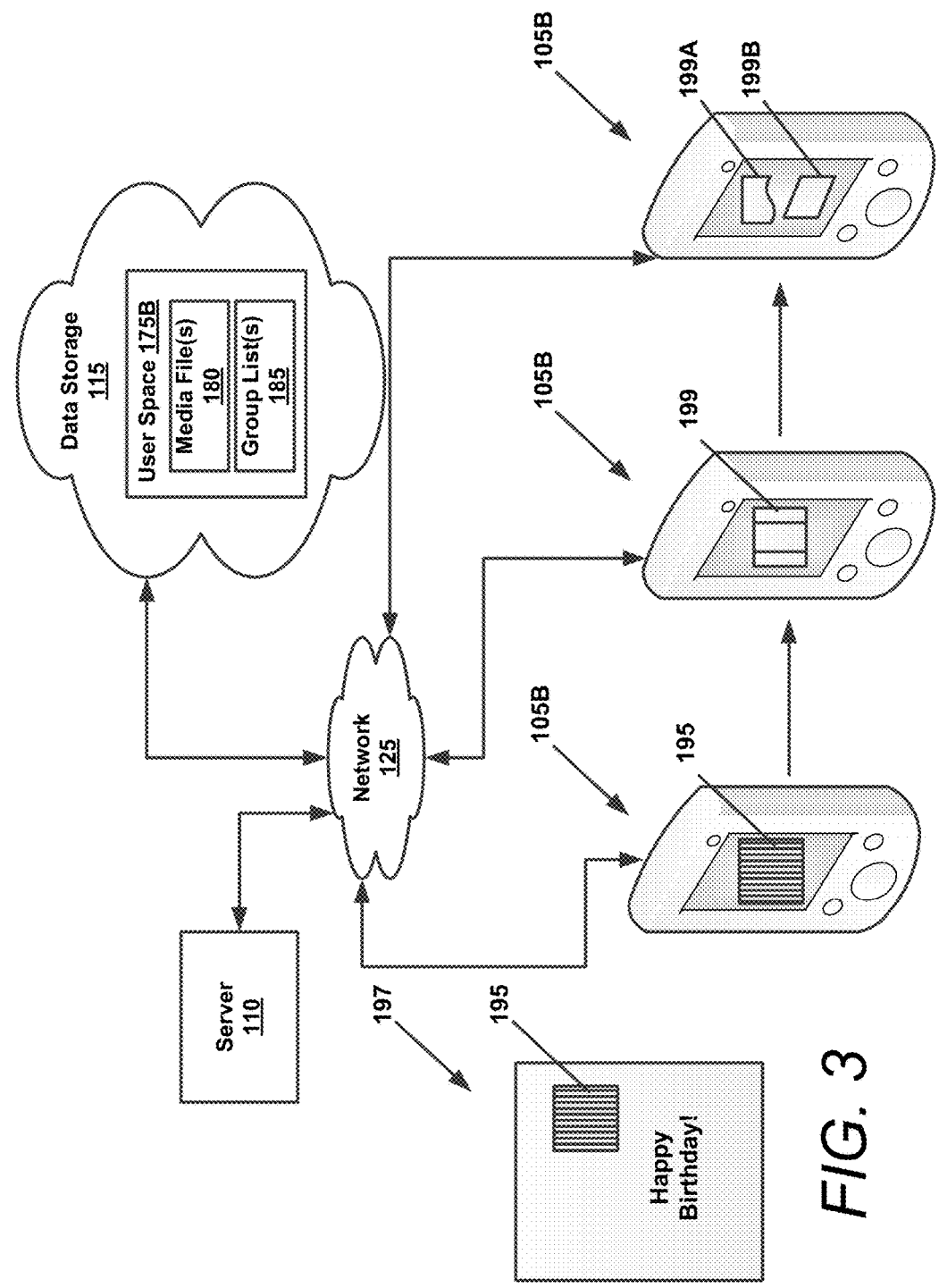
FIG. 3 is a diagrammatic representation of a code scanning method that includes media delivery and group invitation.

FIGS. 1-3 collectively provide a diagrammatic representation of a method of establishing a user account and code activation method of the present technology. In this embodiment, the end user can create a user account 175A by scanning a scannable code tag 195. For example, the end user scans the scannable code tag 195 with the user device 105A. The scannable code tag 19 is printed onto a physical object, such as a greeting card 197. The user device 105A reads the scannable code tag 195 with their scanning device 140. It can be assumed for this example that the scannable code tag 195 is a barcode. Thus, the scanning device 140 used by the app 150 involves a camera of the scanning device 140 receiving a view of the scannable code tag 195. Again, the scanning executed by the scanning device 140 can include an IR reader, a near field communications sensor, or other similar scanning device. The app 150 then reads the scannable code tag using a barcode reading algorithm to extract or recover the scannable code tag information embedded into the scannable code tag. This scannable code tag information corresponds to the scannable code tag information 190 stored in the user account 175A. Thus, it will be understood that the server 110 has created and reserved user account spaces in data storage 115. A particular user account is tied to the unique scannable code tag and the user account is activated by the server 110 when the user scans the scannable code tag 195 for the first time. The user can create a user profile for the user account 175A as mentioned above.

Also, while this example describes the app 150 as being configured to read the scannable code tag 195 and extract information therefrom, the app 150 may also cooperate with the application 170 of the server 110 to accomplish this functionality. For example, the user device 150A may obtain a view of the scannable code tag 195 with the scanning device 140 and transmit the view to the server 110 for processing. Thus, the server 110 can perform functions such as determining what type of scannable code tag is included in the view received from the user device, as well as selecting an appropriate means for reading and extracting information from the determined tag type. For example, if the server 110 determines that the scannable code tag is a barcode, the server 110 will used a barcode reading functionality. When the scannable code tag is determined to be a QR code, the server will used a QR code reading functionality. Again, the app 150 of the user device 105A can be configured to also provide these features. The app 150 may be configured to pass the analysis of the scannable code tag to the server 110 only if the app 150 is unable to determine what type of scannable code tag it is or is unable to extract information therefrom.

The user can then upload a video file 199, to their user space 175B. The video file 199 is represented in the user space 175B as the media file(s) 180.

FIG. 3 illustrates the delivery of both a video file 199 and a gift 199A to the user device 105B of a recipient. It will be understood that the recipient is also required to download the app 150 to their user device 105B. The recipient also creates at least a user profile or grants access to their personal or device specific information. The recipient can also create a user account.

The recipient receives the greeting card 197 that includes the scannable code tag 195 that is owned by the owner of the user account 175A and the user space 175B. The app 150 of the user device 105B scans and reads the scannable code tag information, which includes appropriate information that can be used to query the server 110 for the user account 175A associated with the scannable code tag 195.

When a match is found, the server 110 retrieves the video file 199 from the media file(s) 180 of the user space 175B because the user space 175B is linked to the user account 175A. The video file 199 is delivered to the user device 105B. The server 110 also delivers the gift 199A to the user device 105B.

Examples of gifts include, but are not limited to, a coupon, a gift card, a prize, a voucher, or other gift or reward. The user can select a desired gift 199A and the gift 199A is linked to the media file 180.

The server 110 can link the video file 199 to the gift 199A such that when the video file 199 is delivered to a recipient (user device 105B), the gift is provided along with the video file 199. For example, the video file 199 may include executable code that causes a user device to download and display a link to the gift 199A or the gift 199A itself. FIG. 3 illustrates the display of a gift 199A in the form of a digital coupon. The gift 199A could be presented as post-roll video data, for example similarly to a pre or post roll video advertisement.

The gift 199A may also be provided to the recipient by email delivery or physical deliver if the gift is a physical object. For example, the merchant system 120 can email a coupon to an email address associated with the recipient. The merchant system 120 can also cause the mailing of the coupon to a mailing address of the recipient.

It will be understood that the user or a third party can link a group invitation to either the media file or the gift such that when a recipient receives either the media file or the gift the recipient is delivered a group invitation that invites the recipient to a join a group. The group may include, for example, a social networking group, an email list, an RSS feed, a blog, a pay service, or other group. Types of groups that are specified or defined depend on the particular sector, such as but not limited business, government, healthcare education, etc. in which the application is to be implemented. By way of non-limiting example, in education, a teacher may generate a group for students for a particular class or grade and use the system to provide lesson content which is accessed upon students scanning the associated code tag on books or the like. There are many different sectors and many different types of groups that may be defined.

In another embodiment, the when a recipient receives either the media file or the gift the recipient is automatically joined to with a group.

Again, the group may be defined by the owner of the user account 175A or may be defined by a merchant or vendor that provides the gift that is transmitted to one or more recipients. FIG. 3 illustrates the display of a group invitation 199B on the user device 105B. The group invitation 199B can be displayed separately from the gift 199A in some instances.

In some embodiments, the server 110 automatically adds the recipient to a group. The server 110 can determine a group that the recipient is added to by evaluating their user profile or information obtained from their user device. For example, the server 110 can scan the user's social media accounts, email communications, or application usage to determine the preferences of the user. Using these preferences, the server 110 can automatically add the user to one or more groups. As mentioned previously, the server 110 can add the recipient to a group of the merchant's choosing or a group specified by the owner of the user account 175A. In these embodiments, rather than displaying a group invitation 199B, the group invitation would be replaced with a notification that the recipient has been automatically enrolled in a group.

Figure 4:
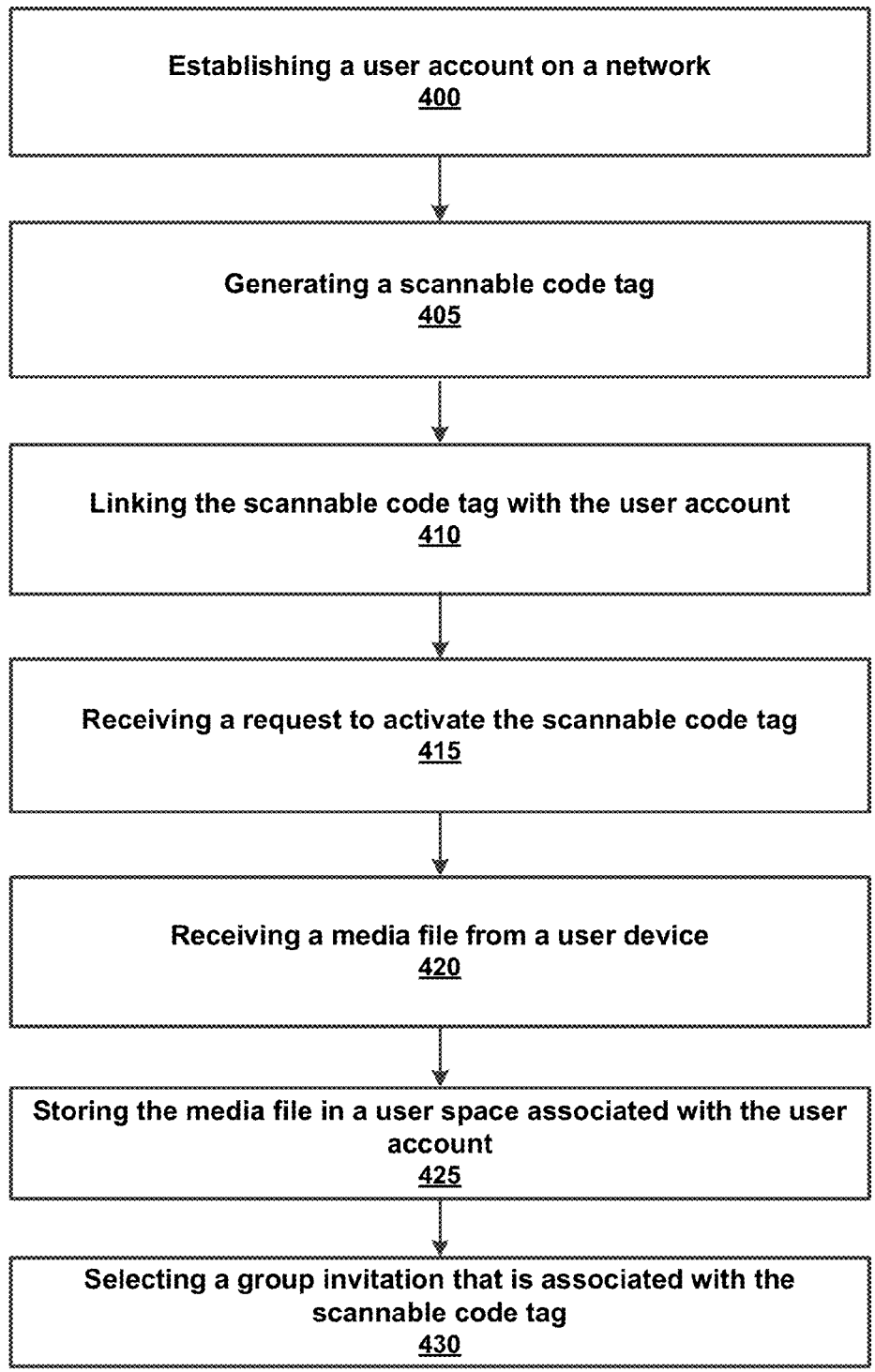
FIG. 4 is a flowchart of a method for creating a scannable code tag that is linked to user account.

FIG. 4 is a flowchart of another example method for creating and activating a user account and a scannable code tag. This method is executed by the server 110 when the processor 155 of the server 110 executes the application 170. In one embodiment, the method includes the server 110 establishing 400 a user account on a network. The network can include the data storage 115 of FIG. 1, for example. The user account is configured to store at least media files for an owner of the user account. The server 110 can create this user account when the user requests creation of the account. For example, when the user downloads the app 150 (FIG. 1) onto their user device 105A, the server 110 cooperates with the app 150 to create the user account 175A and the user space 175B.

Next, the method includes the server 110 generating 405 a scannable code tag. In some embodiments, the server 110 can select the type of scannable code tag or the server 110 can prompt the user to select a scannable code tag type by the app 150. For example, the scannable code tag type can include a barcode, QR code, or any other scannable code tag described herein.

The method includes the server 110 linking 410 the scannable code tag with the user account. For example, the server 110 can create a unique scannable code tag identifier. This scannable code tag identifier 190 could include a logical link, such as a URL that points to a location of the user account 175A on the local storage 160A of the server, or the user space 175B on the data store 115. For example, if the user account 175A is located during the query, the user space 175B can be accessed because it is linked to the user account 175A.

In another example, the scannable code tag identifier could include an identifier, such as a unique username or email address. This scannable code tag identifier is embedded into the scannable code tag and is also stored in the local storage 160A with the user account 175A. Thus, when the scannable code tag is scanned, the scannable code tag identifier is extracted and can be used to locate the user account 175A on the server 110. By way of example, a scannable code tag embodied as a barcode can embed a string of characters such as a string of numeric characters "12355". The string is unique to the owner and the user account 175A. When the scannable code tag is scanned, "12355" is extracted and this character string can be queried against the data store 115 for a user account that corresponds.

In some instances, the scannable code tag is activated when the user account is established. In other instances, the method further includes the server 110 receiving 415 a request to activate the scannable code tag. In these instances, the request is generated by a scan of the scannable code tag by a user device associated with the owner of the user account. The activation further requires receiving 420 a media file from the user device and storing 425 the media file in the user space associated with the user account.

In one embodiment, the method includes the server 110 selecting 430 a group invitation that is associated with the scannable code tag. As mentioned above, the server 110 can select the group invitation based on a dictate from a merchant, the owner of the user account, or the server 110 may select the group invitation from examining user and/or device data. For example, the server 110 can locate an email contact list on the user device of the owner of the user account or user space and add the same to a group list 185 that is stored in the user account 175A or the user space 175B in the group list(s) 185.

When a recipient scans the scannable code tag, the server 110 can perform a lookup to determine if the recipient is included in any group lists 185 that are stored in the user space 175B associated with the scannable code tag. If the recipient is included, the server 110 can deliver the group invitation to the recipient.

As mentioned above, the group invitation can be a forced requirement that the recipient join a particular or selected group. That is, rather than presenting the recipient with an invitation that is optional, the server 110 can automatically add the recipient to the group. In some embodiments, the group invitation may include an automatic subscribe feature that places the recipient in a group when the recipient scans the activated scannable code tag. In some embodiments, a user and/or recipient can, upon downloading of the application to a user/recipient device or during a subsequent user account set up, configure permissions in the user account to determine the manner in which the recipient, in response to the recipient user device scanning the code tag, is to be added to a group and/or the manner in which the media file or other message is to be presented to the recipient and initiated. In some embodiments, in response to the recipient device scanning the code, the system performs automatic addition of the recipient to the group (absent user/recipient intervention). In some embodiments, automatic addition of the recipient to the group is provided in response to the recipient taking further action after scanning of the code tag, such as but not limited to viewing the media file and/or accepting the group invitation. In some embodiments, other device/user account permissions are configurable such as but not limited to: receiving coupons, rewards, offers or the like either automatically or in response to accepting a group invitation and/or viewing the media file or other message.

In some embodiments, the method includes the server 110 tracking a variety of metrics that include, but are not limited to media file usage and sharing by a recipient, gift redemption, and group invitation response by the recipient. For example, the server 110 can determine how many recipients that were presented a group invitation actually joined the group. The app 150 transmits to the server 110 if the recipient joins the group. In some embodiments, tracking metrics are demographic information an/or geographic information. Non-limiting examples of tracking metrics are: viewing time of the media file, number of views of the media file, stop and/or start times of viewing the media file, identity and/or types of subject matter being shared, identity and/or types of user devices being utilized, information that is being shared, transmitted and/or received over networks including the internet. The system is configured to track the aforementioned metrics for one or more users and/or one or more recipients. In another example, if the recipient is automatically added to a group, the server 110 may be informed by the app 150 if the recipient does not participate in the group or if the user unsubscribes from the group. Other group related behavior of the recipient can also be tracked and analyzed.

It will be understood that in some embodiments, steps 400-410 of the method occur separately and independently from steps 415-430. Additional or fewer steps may also be used in the method without departing from the scope of the technology.

Figure 5A:
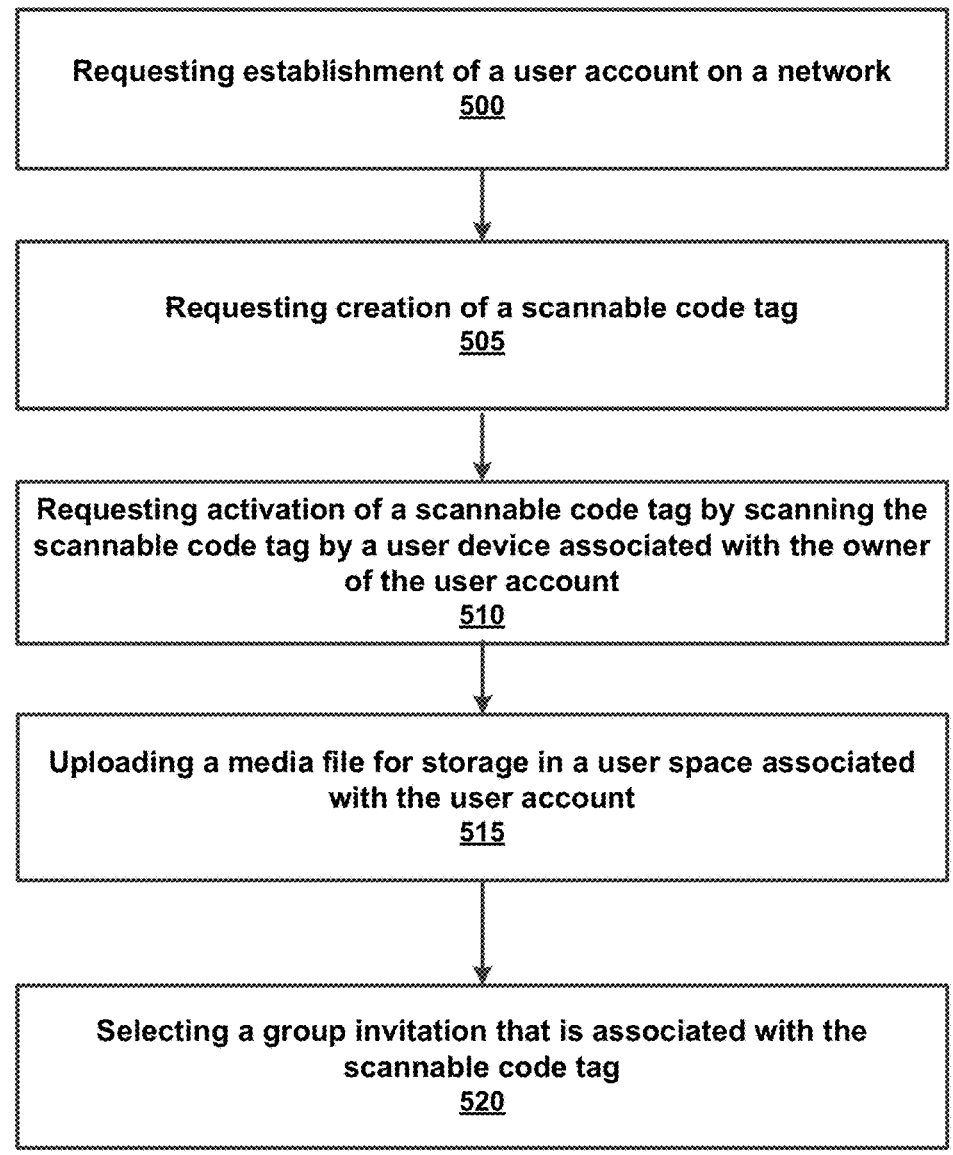
FIGS. 5A and 5B are flowcharts that collectively describe a method for creating a user account and scannable code tag, as well as a method for group invitation and/or automatic grouping based on scanning of a scannable code tag.
Figure 5B:
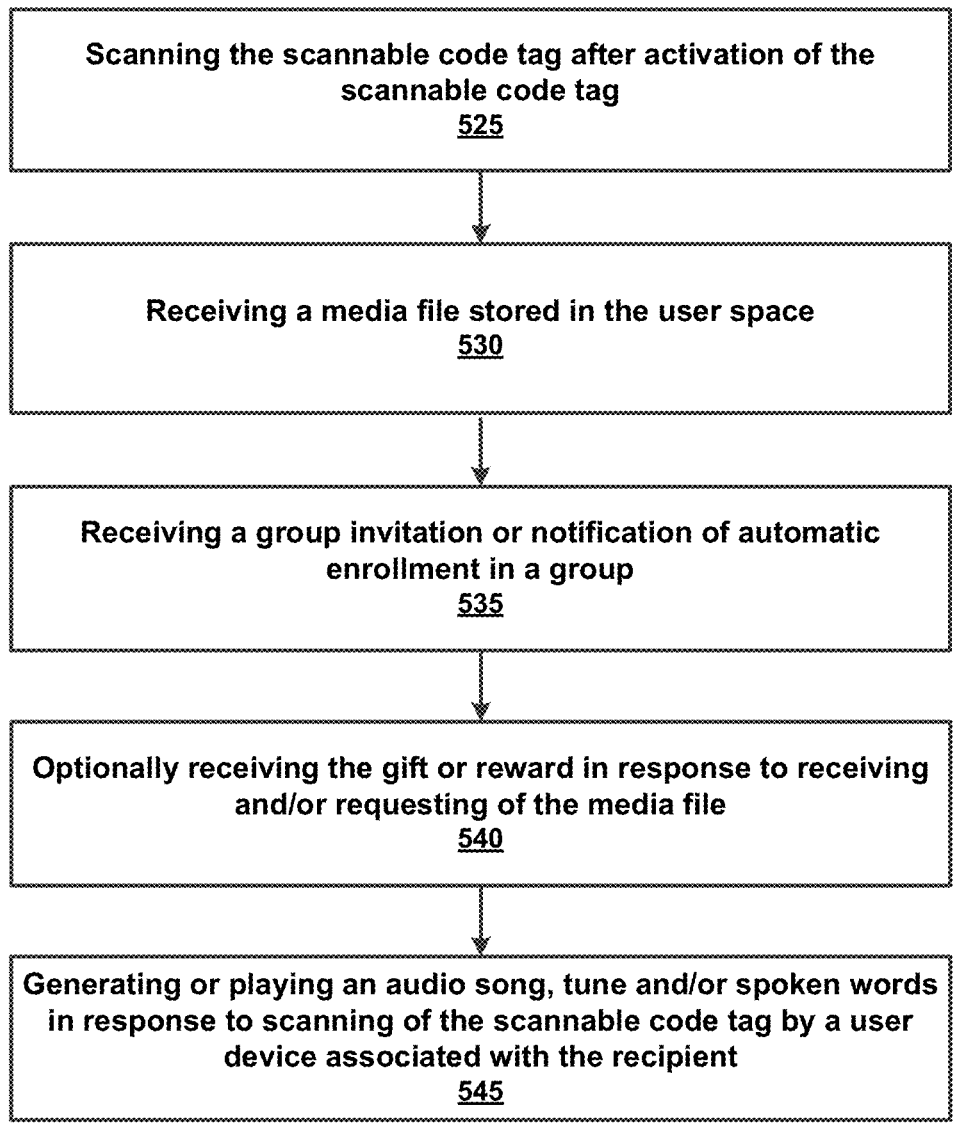

Collectively, FIGS. 5A and 5B are flowcharts of methods for activating and using a scannable code tag. The method illustrated in FIG. 5A includes a process executed by a first user device, such as user device 105A, to request creation of a user account, a scannable code tag, as well as using the scannable code tag. The method is executed by a processor executing instructions stored in memory. In some instances, the instructions are embodied on a non-transitory computer readable medium. For example, a user device (105A or 105B) can download the app 150, which is stored in the memory of the user device.

In one embodiment, the method includes the user device requesting 500 establishment of a user account on a network. Again, the user account is associated with a user space that is configured to store at least media files for an owner of the user account. The user space can be stored in data storage on a cloud and the user account can be stored locally on a server. In some instances the user account and user space can be collocated on the data store.

The method further comprises the user device requesting 505 creation of a scannable code tag. As mentioned above, the scannable code tag is linked to the user account such that the owner of the user account owns the scannable code tag. Thus, the user can delete or replace the media files as necessary or desired, but the scannable code tag remains the same.

In some embodiments, the method includes the user device requesting 510 activation of a scannable code tag by scanning the scannable code tag by a user device associated with the owner of the user account. In this manner, the scannable code tag is pre-generated and pre-exists before then being electronically associated with the user account and the user.

During activation, the method includes the user device uploading 515 a media file for storage in the user account. For example, the user can create a video file using the user device and upload the same for storage on their user account. Again, a gift or reward can be associated with the media file, as has been described in greater detail above.

Next, the activation includes selecting 520 a group invitation that is associated with the scannable code tag. For example, a merchant may desire to have anyone who scans the active scannable code tag added to a group, such as a social network group, like a Facebook™ page or a Twitter™ feed of the merchant. The merchant may be allowed to include this automatic group subscribe feature, with or without the consent of the owner of the user account. Each time a recipient scans the scannable code tag, the recipient is added to the group.

FIG. 5B is a flowchart of a method executed by a second user device, such as user device 105B, subsequent to activation of a scannable code tag. The method includes the user device 105B scanning 525 the scannable code tag after activation of the scannable code tag. For example, the user device 105B receives a view of the activated scannable code tag using a camera device (scanning device 140) of the user device 105B. The user device 105B reads the scannable code tag information and queries the same against the data store 115 to locate a user account that corresponds.

Once requested, the method includes the user device 105B receiving 530 a media file stored in the user account. For example, the server 110 may deliver the media file to the user device 105B. Next, the method includes the user device 105B receiving 535 a group invitation or notification of automatic enrollment in a group.

In some embodiments, the method includes optionally receiving 540 the gift or reward in response to receiving and/or requesting of the media file. This step is optional because the delivery of the gift or reward may be conditional upon the recipient actually viewing or playing the media file.

In one embodiment, the method includes generating 545 or playing an audio song, tune and/or spoken words in response to scanning of the scannable code tag by a user device associated with the recipient.

In one or more of the aforementioned embodiments, the end user device is configured to generate an audio message, song, name, spoken works, tune, sound effect or any combination therefore either alone in combination with the media file. For example, the audio is electronically associated with the code tag in the same manner as the media file, or is part of the media file itself, and/or is programmed via the device application into the end user device/recipient device so that upon the recipient scanning of the code tag, the audio song, tune, message etc. is played automatically without user/recipient intervention or in response to the media file being accessed. By way of non-limiting example, a birthday song, either generic or personalized by the user, can be played automatically on the recipient device in response to the recipient scanning the code tag.

In yet other embodiments, user account information of the user account associated with the scannable code tag is loaded into an electronic form, or other user application, in response to the recipient scanning the scannable code. In one embodiment, an electronic form, such as a pdf document, is automatically generated on the recipient user device in response to scanning the code tag, and the user account information associated with the code tag is auto populated or filled into the electronic form. The user account permission is configured by the user to allow automatic access to the user account information associated with the code tag upon scanning of the code tag by the recipient. Alternatively, the user account permissions are configurable so that a message request is first sent to the user account, or user of the user account, in response to the code tag being scanned by the user device of the recipient and then the user account information is automatically accessible at the recipient end in response to a reply to the message request allowing such access to the user account information.

In some embodiments, a scannable code tag can be associated with a group of individuals. For example, in one embodiment, a recipient is added to a upon the scanning of the scannable code tag by a user device associated with the recipient. The scannable code tag is updated by associating members of the group, and any received group member messages, to the scannable code tag.

Also, the user/recipient are presented both or either of the group members and any received group messages upon the scanning of the updated scannable.

Figure 6:
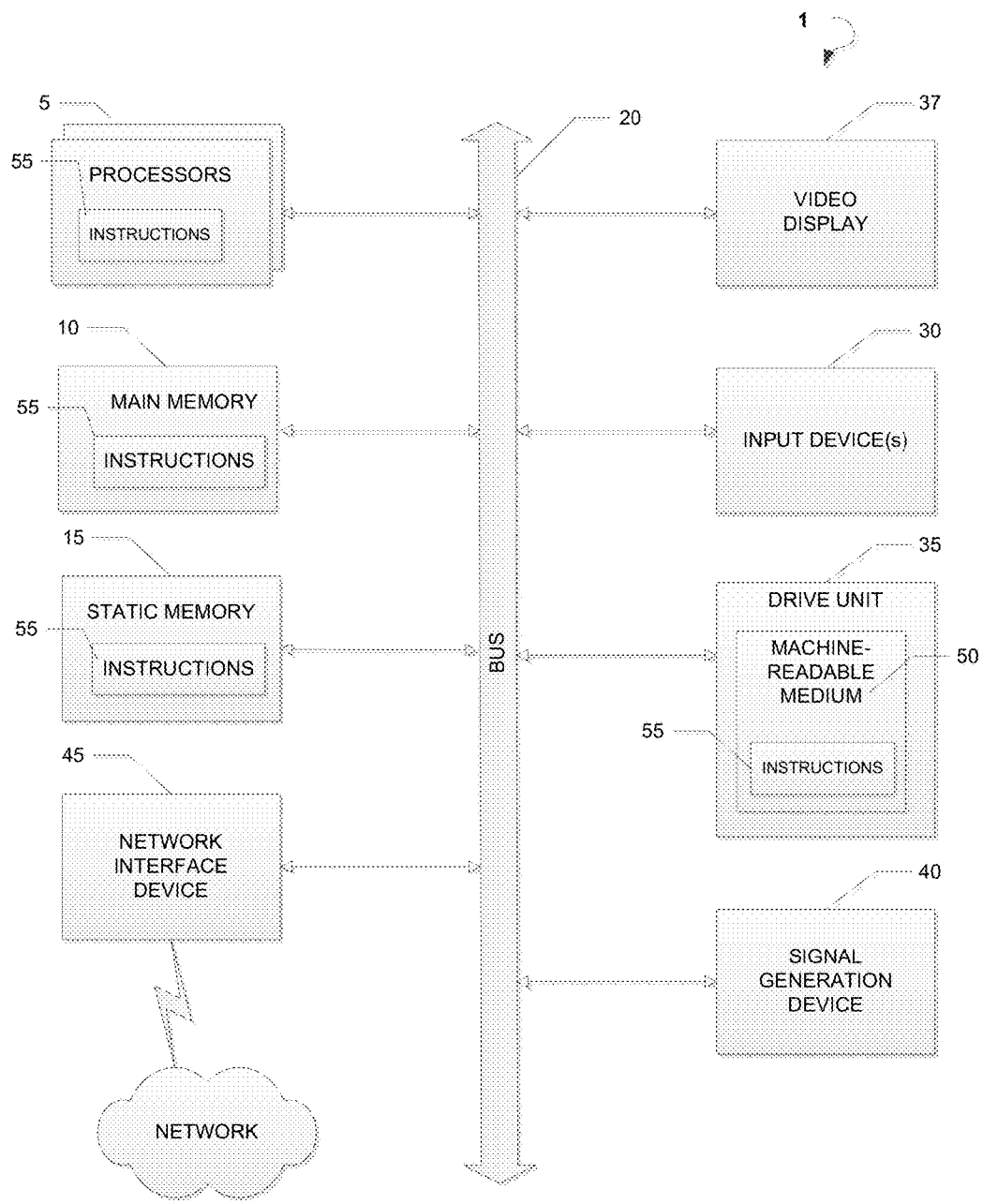
FIG. 6 illustrates an exemplary computing device that may be used to implement an embodiment of the present technology.

It will be understood that the term "user" can refer to either a sender or a recipient. A user account or user space can be associated with either a sender or a recipient. Whether a user is a "sender" or a recipient" is based on the context in which the term user is found. For example, the user that uploads a media file for association with a scannable code tag is the "sender", whereas the user that receives the scannable code tag, scans the scannable code tag, and receives the media file, gift and/or group invitation is the "recipient", FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 37 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 35 (also referred to as disk drive unit), a signal generation device 40 (e.g., a speaker), and a network interface device 45. The computer system 1 may further include a data encryption module (not shown) to encrypt data.

The drive unit 35 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated. Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the described embodiments of the invention are illustrative only and that modifications thereof may occur to those skilled in the art. Accordingly, this invention is not to be regarded as limited to the embodiments disclosed, but is to be limited only as defined by the appended claims herein. It will further be understood that any features described in relation to any particular embodiment may be featured in combinations with other embodiments, for avoidance of doubt.

REFERENCES (incorporated herein by reference)

Please find references below.

What is claimed is:

1. A method for creating a scannable code tag, the method comprising:
    establishing a user account on a network, the user account being linked to a user space configured to store at least media files for an owner of the user account;
    generating a scannable code tag;
    linking the scannable code tag with the user account and the owner;
    receiving a request to activate the scannable code tag,
    receiving a media file from the user device;
    storing the media file in the user space associated with the user account;
    selecting a group invitation that is associated with the scannable code tag;
    generating said group invitation in response to a scan of the scannable tag by a user device; and
    tracking metrics regarding any of scanning of the scannable code tag by the recipient, viewing of the media file by the recipient, response to the group invitation, and sharing of the group invitation by the recipient on one or more social networks.

2. The method according to claim 1, further comprising:
    receiving a request for the media file when a recipient scans the scannable code tag with a user device associated with the recipient;
    delivering the media file to the user device associated with the recipient; and
    delivering the group invitation to the user device associated with the recipient.

3. The method according to claim 1, further comprising applying the scannable code tag to an object.

4. The method according to claim 1, further comprising: automatically adding a recipient to a group upon the scanning of the scannable code tag by a user device associated with the recipient.

5. The method according to claim 1, further comprising:
receiving a message indicating that a recipient has scanned the scannable code tag;
accessing user information included on a user device associated with the recipient that was used to scan the scannable code tag; and
pushing the group invitation to the user device associated with the recipient based upon the user information accessed from the user device.

6. The method according to claim 5, further comprising providing to the recipient any of a reward, a coupon, an announcement, or combinations thereof.

7. The method according to claim 1, further comprising:
linking a gift, reward, offer and/or coupon to the scannable code tag, wherein the group invitation is defined by a merchant, vendor, purchaser, user or creator that provides the gift, reward, offer and/or coupon for the scannable code tag;
delivering the gift, reward, offer and/or coupon to a recipient who scans the scannable code tag.

8. The method according to claim 1, further comprising:
receiving a response to the group invitation in the form of a media file generate by the recipient; and
storing the response in the user space associated with the user account.

9. The method according to claim 1, further comprising:
updating the media file with a second media file;
receiving a scan of the scannable code tag after updating the media file; and
delivering the second media file in response to the scan of the scannable code tag.

10. The method according to claim 1, further comprising delivering the group invitation to a plurality of recipients that are included in a list associated with the user account.

11. The method according to claim 10, wherein the list is derived from an electronic address book, a database, a customer relations management system, or combinations thereof.

12. The method according to claim 1, further comprising:
adding a recipient to a group upon the scanning of the scannable code tag by a user device associated with the recipient;
updating the scannable code tag by associating members of the group, and any received group member messages, to the scannable code tag;
presenting said group members and any received group messages to a user/recipient upon the scanning of the updated scannable code tag by a user device associated with the recipient.

13. The method according to claim 1, further comprising generating or playing an audio song, tune and/or spoken words in response to scanning of the scannable code tag by a user device associated with the recipient.

14. The method according to claim 1 further comprising transmitting the group invitation to participants in a group.

15. A non-transitory computer readable medium having recorded thereon a program, the program when executed causing a computer to perform a method, the method comprising:
requesting establishment of a user account on a network, the user account being linked to a user space configured to store at least media files for an owner of the user account;
requesting creation of a scannable code tag, the scannable code tag being linked to the user account; and
requesting activation of a scannable code tag; and;
generating a group invitation in response to a scan of the scannable tag by a user device; and
tracking metrics regarding any of scanning of the scannable code tag, viewing of the media file, response to a group invitation, and sharing of the group invitation on one or more social networks.

16. The non-transitory computer readable medium according to claim 15, the method further comprising:
uploading a media file for storage in a user space associated with the user account; and
selecting the group invitation that is associated with the scannable code tag.

17. The non-transitory computer readable medium according to claim 15, the method further comprising:
scanning the scannable code tag after activation of the scannable code tag;
receiving the media file; and
receiving a group invitation or notification of automatic enrollment in a group.

18. The non-transitory computer readable medium according to claim 15, the method further comprising transmitting the group invitation to participants in a group.

19. The non-transitory computer readable medium according to claim 15, further comprising receiving any of a reward, a coupon, an announcement, or combinations thereof in response to scanning the scannable code tag after activation of the scannable code tag.

20. A computing device, comprising:
a memory for storing executable instructions, the executable instructions for creating a scannable code tag;
a processor for executing the instructions to:
establish a user account on a network, the user account being linked to a user space configured to store at least media files for an owner of the user account;
generate a scannable code tag;
link the scannable code tag with the user account;
receive a request to activate the scannable code tag, the request being generated by a scan of the scannable code tag by a user device associated with the owner of the user account;
receive a media file from the user device;
store the media file in the user space associated with the user account;
associate a group with the scannable code tag; and
add a recipient to said group when the scannable code tag is scanned; and
track metrics regarding any of scanning of the scannable code tag by the recipient, viewing of the media file by the recipient, response to the group invitation, and sharing of the group invitation by the recipient on one or more social networks.

21. The computing device according to claim 20, wherein the processor further executes the instructions stored in memory to:
receive a request for the media file when the recipient scans the scannable code tag with a user device associated with the recipient;
deliver the media file to the user device associated with the recipient; and
deliver a group invitation to the user device associated with the recipient rather than automatically add a recipient to a group when the scannable code tag is scanned.

22. The computing device according to claim 20, wherein the processor further executes the instructions stored in memory to:
- receive a message indicating that a recipient has scanned the scannable code tag;
- deliver the media file to the user device associated with the recipient; and
- deliver a media file to the user device associated with the recipient after the media file has been delivered.

23. The computing device according to claim 20, wherein the processor further executes the instructions stored in memory to:
- receive a message indicating that a recipient has scanned the scannable code tag;
- access user information included on a user device associated with the recipient that was used to scan the scannable code tag; and
- select the group based upon the user information accessed from the user device.

24. The computing device according to claim 20, wherein the processor further executes the instructions stored in memory to provide to the recipient any of a reward, a coupon, an announcement, or combinations thereof after the recipient scans the scannable code tag, wherein the reward, the coupon, and the announcement are provided by a merchant or vendor that also defines the group.

* * * * *